(No Model.) 3 Sheets—Sheet 1.
W. P. HUNT & C. P. A. FRIBERG.
DIVIDED AND BENT AXLE FOR CORN PLANTERS.
No. 601,342. Patented Mar. 29, 1898.
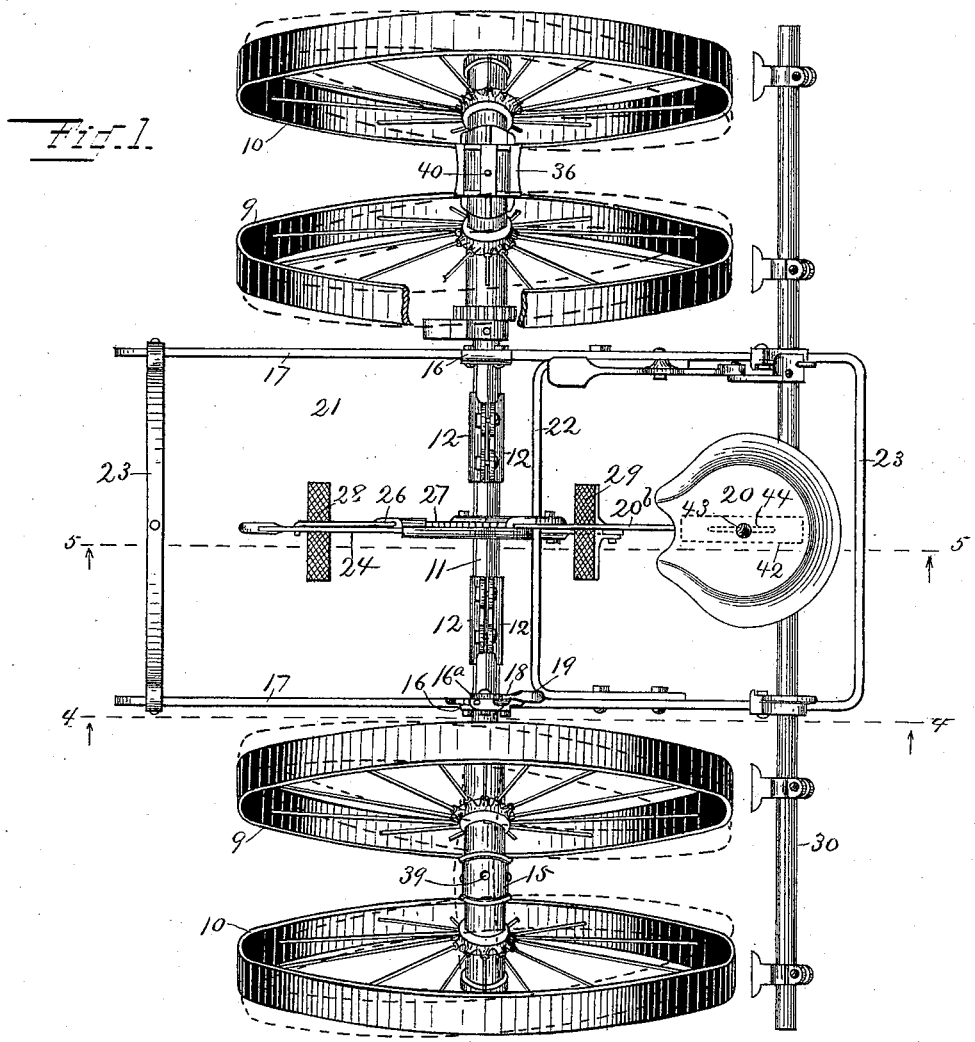
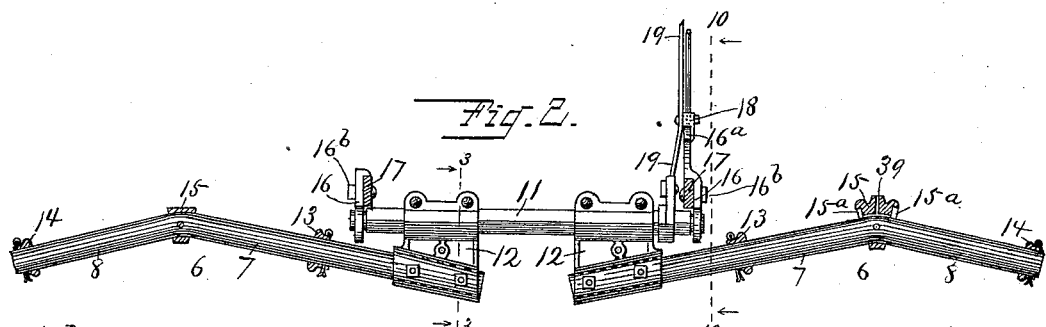
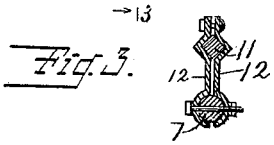
Witnesses:
P. R. Richards,
H. M. Richards.
Inventors:
W. P. Hunt and
Chas. P. A. Friberg,
By W. B. Richards,
Atty.

(No Model.) 3 Sheets—Sheet 2.
W. P. HUNT & C. P. A. FRIBERG.
DIVIDED AND BENT AXLE FOR CORN PLANTERS.
No. 601,342. Patented Mar. 29, 1898.
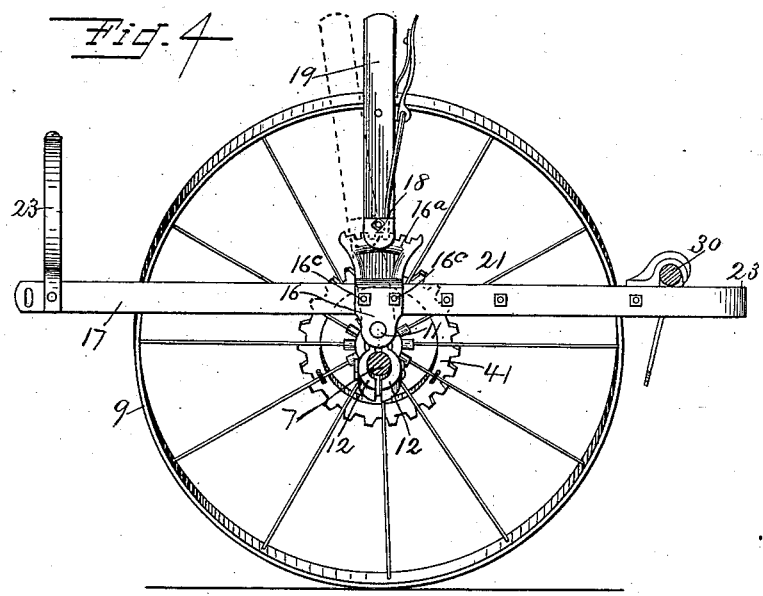
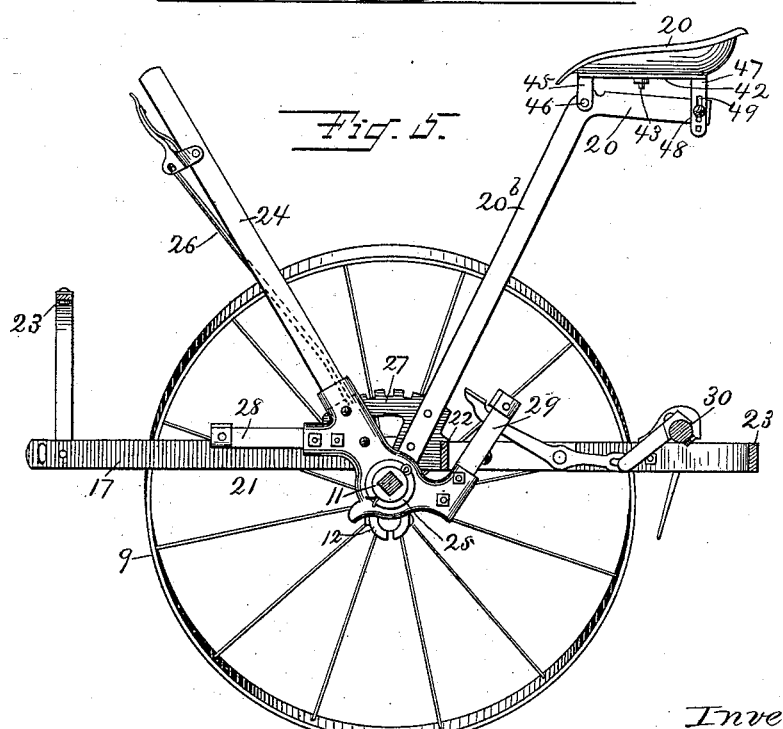
Witnesses:
Inventors:

(No Model.) 3 Sheets—Sheet 3.
W. P. HUNT & C. P. A. FRIBERG.
DIVIDED AND BENT AXLE FOR CORN PLANTERS.
No. 601,342. Patented Mar. 29, 1898.
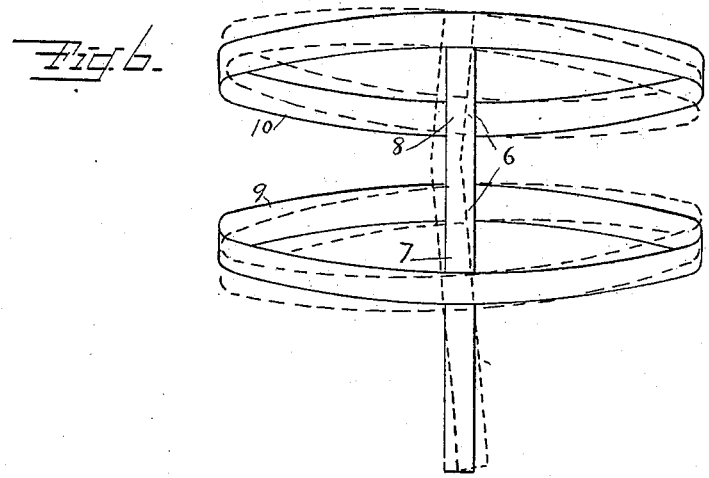
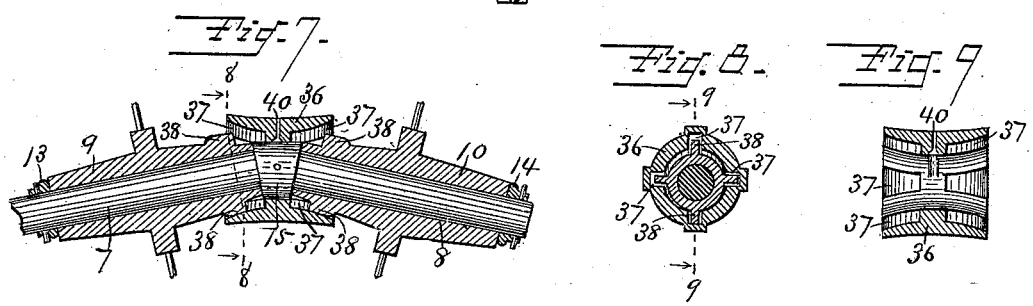
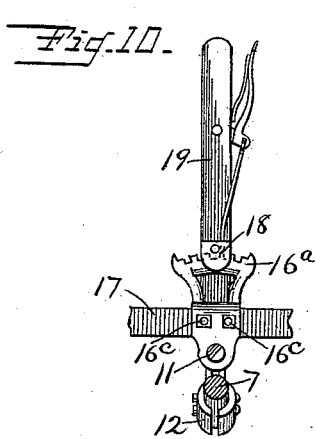
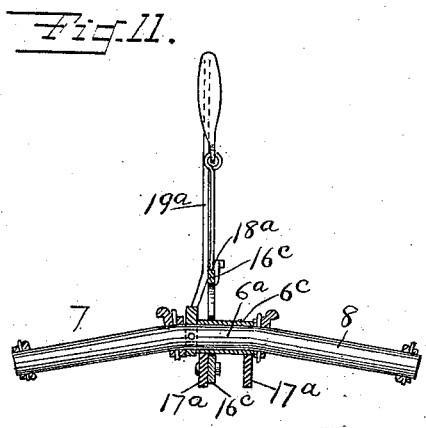
Witnesses:
S. R. Richards
H. M. Richards
Inventors:
W. P. Hunt,
Chas. P. A. Friberg,
By W. B. Richards,
Atty.

United States Patent Office.

WILSON P. HUNT AND CHARLES P. A. FRIBERG, OF MOLINE, ILLINOIS, ASSIGNORS TO THE DEERE & MANSUR COMPANY, OF SAME PLACE.

DIVIDED AND BENT AXLE FOR CORN-PLANTERS.

SPECIFICATION forming part of Letters Patent No. 601,342, dated March 29, 1898.

Application filed November 18, 1897. Serial No. 659,025. (No model.)

*To all whom it may concern:*

Be it known that we, WILSON P. HUNT and CHARLES P. A. FRIBERG, citizens of the United States, residing at Moline, in the county of Rock Island and State of Illinois, have invented certain new and useful Improvements in Four-Wheel Divided and Bent Axles for Corn-Planters, of which the following is a specification.

Our invention relates to four-wheel divided and bent axles for corn-planters or axles which have a pair of seed-covering, soil-compacting, and planter-supporting wheels on each end thereof and which are bent at their outer end parts to incline the wheels of each pair thereof in opposite directions and are divided or separable into parts whereby the inner wheel of each pair may be put in its place on the axle.

Prior to our invention, so far as known to us, such axles have been rigidly and unadjustably attached to the planter-frame, and no means have been provided whereby they can be adjusted to cause the wheels of each pair thereof to run with their forward and rear parts at the same distance apart or at different distances apart, as may be required.

The leading objects of our invention are to provide planters with axles of the type referred to mounted on the planter in such manner that they are capable of being rocked to change the inclination of the wheels, and, further, to provide means whereby the driver on the planter can conveniently rock the axle and also lock it in different angular positions; and a still further object is to cause both wheels of one or both pairs thereof to rotate together or simultaneously by means of a clutch connection which, while it connects the two wheels of a pair thereof, will permit of adjustments thereof by rocking the axle.

Other objects of the invention are hereinafter described.

With the foregoing-recited objects and other objects hereinafter recited in view the invention consists in constructions and combinations of parts, substantially as hereinafter described, and pointed out in the claims herewith.

In the accompanying drawings, Figure 1 is a top plan of the rear frame or "back" of a corn-planter embodying our improvements; Fig. 2, a front elevation of the axle of Fig. 1, a sectional elevation of the side frame-bars, and an elevation of the lever for rocking the axle; Fig. 3, a sectional elevation in the line 3 3 in Fig. 2; Fig. 4, a sectional elevation of the axle in the line 4 4 in Fig. 1 and side elevation of the near frame-bar and parts adjacent thereto; Fig. 5, a sectional elevation in the line 5 5 in Fig. 1; Fig. 6, a diagrammatic top plan representation of one pair of wheels and the adjacent end of the axle; Fig. 7, a central vertical sectional elevation of the right-hand pair of wheels and the coöperative end of the axle of Fig. 1; Fig. 8, a sectional elevation in the line 8 8 in Fig. 7; Fig. 9, a sectional elevation in the line 9 9 in Fig. 8; Fig. 10, a sectional elevation in the line 10 10 in Fig. 2; Fig. 11, a modification hereinafter described.

The same reference characters herein used indicate, respectively, the same part in the different figures of the drawings.

As shown, the inclined ends 6 of the axle are of the same form and each bent to form a spindle 7 for the inner wheel 9 and a spindle 8 for the outer wheel 10. As shown best at Fig. 2, a central part 11 of the axle is connected near its ends with the inner extended ends of the bent end parts 6 by means of clamp-plates 12 bolted thereto. Each spindle 7 has a butting ring 13 for the inner wheel and each spindle 8 a butting ring 14 for the outer wheel, and a single butting ring 15 is bolted at the union of said spindles for both wheels.

The part 11 is substantially in a line slightly below the upper part of the union of said spindles 7 and 8; but it may vary up or down to any extent from said line at which it will still properly adjust the angle of the wheels, as hereinafter described. The bar or part 11 is journaled at its end parts in the lower ends of brackets 16, one of which brackets is fixed by bolts 16° to each side frame-bar 17. One of the brackets 16 is extended upwardly to form a curved rack-bar 16ª, having teeth with which a spring-actuated dog 18, mounted on a hand-lever 19, engages. The hand-lever 19 is fixed at its lower end to the central or median part 11 of the axle, so that it can be used to rock said axle back and forth on its journal-bearings in the brackets 16, and the dog 18 can be used to lock said axle in different angular relations to its center of motion.

By reference to the drawings it will be seen that each wheel 9 and 10 is at a right angle to the spindle on which it is journaled. Hence when the axle is adjusted with the spindles 7 and 8 in a vertical plane, as shown by full lines in the drawings, the wheels of each pair thereof will be held inclined or tilted from each other at their upper sides and will be held at the same distances apart at their forward and rear sides. It will further be seen that by adjustments of the hand-lever forwardly of the planter at its upper end, as shown at Fig. 4, the spindles 7 and 8 will be partially rotated to lie in inclined planes at any angle determined by the degree or angle of adjustment of the hand-lever. An adjustment of this kind of the wheels is shown by dot-lines at Figs. 1 and 6, from which it will be evident that by swinging the hand-lever forwardly the spindles 7 and 8 are turned to give gather to all of the spindles and thereby increase the distance between the forward parts of each pair of wheels and diminish the distance between their rear parts. By different adjustments of the hand-lever and locking it after such adjustments the extent of the gather of the spindles can be adjusted and the angles of the planes of rotation of each pair of wheels also be adjusted with reference to a horizontal line between them and transversely of and in same plane as the axle.

By the foregoing-recited means the wheels 9 and 10 of both pair thereof can be simultaneously, quickly, and easily adjusted by the driver using the hand-lever 19 without removal from his seat 20, and he can thus simultaneously, quickly, and easily adjust the wheels 9 and 10 of each pair thereof, as may be desired, at different angles of divergence from each other from their hindermost parts toward their forward parts, while at the same time such adjustments will vary the angle of divergence of the wheels vertically, but very slightly. The operation of the two wheels following each seed-depositing tube when tipped or inclined away from each other at their upper parts is well known in regard to their functions in compressing the soil at each side of the row of deposited seed and not immediately over the seed, and especially as to their functions arising from the action of the tipped wheels on the soil in that they have in addition to the rolling and compressing contact with and on the soil of ordinary vertical split wheels, further having a frictional contact therewith which will tend to force the soil into a ridge over the row of seed and to open somewhat deeper trenches at each side thereof and paralleling the row of seed. Additional functions arise in the use of such wheels when divergent from each other from their rear to their forward sides, especially in that their frictional contact with the soil is increased to such an extent as to become a factor in addition to the weight in pulverizing the soil and also a factor in positively forcing the soil toward the row of deposited seed, and thereby positively closing the groove made by the furrow-opener and insuring a deeper and more thorough covering over the seed than can be secured by wheels without such divergence, and the extent of this divergence as embodied in our invention being adjustable it can be regulated to better suit the requirements of different soils.

With divided four-wheel bent axles as heretofore constructed and fixed to the planter-frame in raising the forward ends of the side frame-bars 17 in an ordinary manner for the purpose of raising the runners (not shown) above the ground the axle will be partially rotated rearwardly and thus diminish the angle of divergence of the wheels of each pair from their rear to their forward parts, and thus prevent the wheels running smoothly in local transportation over roads and on its own wheels. With our improvements the hand-lever can be used to adjust the axle, so that there will not be any divergence of the wheels of each pair from their rear parts to their front parts when the rear frame-bars 17 are tilted to raise their forward ends, as described. This type of axle may be constructed with a bent or inclined spindle 8 at the outer end of each part 6 and a spindle 7, which is parallel with the part 11 and connecting the inner ends of the spindles 7 with the respective adjacent ends of the part 11, as hereinbefore described. In this modification the two inner wheels 9 will neither diverge at their upper nor their forward sides, and rocking the axle will not affect them, but rocking the axle will adjust the two outer wheels 10 and change the angle of divergence of each of said outer wheels from its rear toward its front side with respect to the adjacent wheel in same manner as hereinbefore described.

The rear frame 21 is an ordinary frame formed of side bars 17 and transverse bars 22 23. The hand-lever 24 is pivotally mounted on a collar 25, which is fixed on the central or median part 11 of the axle and has a spring-actuated dog 26, which engages with the teeth of a curved rack-bar 27, which is also mounted on the collar 25 and is fixed to the transverse frame-bar 22. The hand-lever 24 is provided with ordinary foot-pedals 28 29, the pedal 28 being connected in any ordinary manner (not shown) with an ordinary forward frame and seeding mechanism. (Not shown.) The straight bar 11, being at the center of the rocking motion of the axle, affords an efficient support for the hand-lever 24 and part of the support for the rack-bar 27 and the driver's seat 20 substantially over the axle, and with a minimum of tendency to tilt or tip the rear frame, and thereby exert a force to either raise or lower the forward frame, as the case may be. Ordinary scraper-carrying bars 30 and ordinary means for operating them are shown.

As shown at Figs. 1 and 5, the seat 20 is adjustable forward and rearward of the planter on a slotted bar 42, and is held after such adjustments by a bolt 43, which passes through the seat and through the slot 44 in said bar. (Shown by dot-lines at Fig. 1.) A bracket 45, pendent from one end of the bar 42, is pivotally connected by a bolt 46 with one end of the horizontal part 20 of the seat-supporting bar 20$^b$, and a similar but longer bracket 47, pendent from the other end of the bar 42, is connected with the other end of the part 20 by a bolt 48, which passes through a slot 49 in said bracket and hole in the part 20. By loosening the nut on said bolt 48 the driver's seat 20 may be adjusted at different angles of elevation in an evident manner and be held after such adjustments by again tightening the nut.

The seeding mechanism (not shown) or any part thereof may be driven from one pair of wheels 9 10. To render this operation certain, we provide a clutch or coupling 36, which consists of a hollow sleeve embracing the adjacent ends of the hubs of one pair of wheels. (See Fig. 7.) The coupling 36 has curved longitudinal grooves 37, (see Fig. 9,) which engage with corresponding ribs 38 on the adjacent ends of said hubs. (See Figs. 7 and 8.) When thus coupled, the pair of wheels must rotate together. Hence if either one runs over a ridge or over a low place, so that one wheel would not rotate if not coupled with the adjacent wheel, in such case when they are so coupled both will be rotated at all times by the wheel which contacts with the ground and is thereby rotated, thus producing substantially continuous operation of the seeding mechanism when the planter is in operation. The butting ring 15 within the coupling 36 is smaller than the other butting ring 15, (see Fig. 2,) and the other or larger ring has annular grooves 15$^a$, which receive the ends of the hubs and has an oiling-hole 39. The coupling 36 also has an oiling-hole 40. With the pair of wheels coupled together, as described, a sprocket-wheel 41, fixed to the side of the inner wheel 9, which is toward the wheel 10, (see Fig. 4,) may be geared in an ordinary manner by a sprocket-chain (not shown) with the seeding mechanism for operating the same.

Axles extending entirely across the planter when made as herein described and as shown in the drawings may have bent ends to form oppositely-inclined spindles for a pair of wheels on each end thereof, and the inner wheels be easily placed thereon or removed therefrom by first removing the spindles from the median or central part of the axle and removing the butting rings 13, and when so made and journaled to the planter-frame can be rocked to adjust the wheels of each pair thereof at different angles of divergence from their rear sides to their forward sides, as may be desired in different kinds of soil.

In the modification shown at Fig. 11 a transverse sectional elevation of one side of a planter-frame formed of two bars 17$^a$ is shown with a side elevation of the inclined spindles 7 and 8 for one pair of wheels and sectional elevation of the bearing 6$^c$ supported on the frame, in which bearing the horizontal part 6$^a$ between and connecting the spindles 7 and 8 is journaled to permit of rocking said spindles to adjust their gather. The hand-lever 19$^a$ of this modification is rigidly connected at its lower end with the part 6$^a$, and is locked after angular adjustments thereof by means of a spring-actuated dog 18$^a$, which engages with a rack-bar 16$^c$, which is also mounted on the frame-bars. By angular adjustments of a lever of this kind at each side of the planter both pairs of wheels may be adjusted for the purposes hereinbefore described.

Although we have specifically described the construction and relative arrangement of the several elements of our improvements, yet we do not desire to be confined to such specific constructions, as such changes or modifications may be made as fairly fall within the scope of our invention.

Having thus described our invention, we claim as new—

1. In a corn-planter, and in combination, a planter-frame, four wheels, an axle of the type described, and means for pivotally connecting said axle with said frame, substantially as described and for the purpose specified.

2. The combination of a frame, four wheels, an axle of the type described, and means for pivotally connecting said axle with said frame, whereby the axle may be rocked relatively to the frame substantially as described.

3. In a corn-planter, and in combination, a planter-frame, brackets connected with said frame, four wheels, and an axle of the type described pivotally mounted in said brackets, substantially as described.

4. In a corn-planter, and in combination, substantially as described, a planter-frame, four wheels, an axle of the type described pivotally connected with said frame, and a lever for rocking the axle.

5. In a corn-planter, and in combination, substantially as described, a planter-frame, four wheels, an axle of the type described, and a lever fixed to said axle for rocking it.

6. In a corn-planter, and in combination substantially as described, a planter-frame, wheels, an axle of the type described, and an axle rocking and locking lever fixed to said axle.

7. In a corn-planter, and in combination, substantially as described, a planter-frame, two pairs of wheels, a divided, bent axle, and an axle rocking and locking lever.

8. In a planter, and in combination, substantially as described, a planter-frame, wheels journaled on a pair of inclined spindles, and a wheel-spindle rocking and locking lever.

9. In a corn-planter, and in combination, substantially as described, a planter-frame, brackets fixed to said frame, wheels, an axle of the type described journaled in said brackets, and a locking-lever fixed to said axle for rocking and locking it.

10. In a corn-planter, and in combination substantially as described, a planter-frame, brackets fixed to said frame, wheels, an axle of the type described journaled in said brackets, a locking-lever fixed to said axle for rocking it, and a curved rack-bar formed by an extension of one of said brackets.

11. In a planter, and in combination, a planter-frame, seeding mechanism, four wheels and a divided and bent axle formed of a central part and bent end parts secured to said central part by clamping-plates 12, or split sleeves.

12. In a corn-planter, and in combination substantially as described, a planter-frame, wheels, a rocking axle of the type described, means for pivotally connecting said axle with said frame, a collar fixed to the axle, a forward frame-lifting lever journaled on said collar, a curved rack-bar journaled on said collar, and fixed to a transverse frame-bar, and a seat-supporting bar fixed to said rack-bar.

13. In a corn-planter, and in combination, substantially as described, a planter-frame, wheels, an axle of the type described, and a hollow coupling-sleeve, adapted to engage with the adjacent ends of the hubs of one pair of said wheels.

14. In a corn-planter, and in combination, substantially as described, a planter-frame, an axle of the type described, two pairs of wheels, ribs or projections on the adjacent ends of the hubs of one pair of said wheels, and a hollow coupling-sleeve with grooves adapted to engage with the ribs on said hubs.

15. In a corn-planter, the combination with a seat-supporting bar and seat, of a bar 42 having a slot 44, brackets 45, 47, pendent from the bar 42, a pivotal connection of the bracket 45 to the seat-supporting bar, a slot in the bracket 47, a bolt by which it is adjustably fixed to the seat-supporting bar, and a bolt 43, by means of which the seat is adjustably fixed to the seat-supporting bar, substantially as described.

In testimony whereof we affix our signatures in presence of two witnesses.

WILSON P. HUNT.
CHARLES P. A. FRIBERG.

Witnesses:
OSCAR F. LUNDAHL,
BAILEY W. AVERY.